United States Patent
Tynderfeldt et al.

(10) Patent No.: US 11,044,755 B2
(45) Date of Patent: *Jun. 22, 2021

(54) SELECTION OF TRANSMIT MODE DURING A RANDOM ACCESS PROCEDURE

(71) Applicant: Telefonaktiebolaget LM Ericsson (publ), Stockholm (SE)

(72) Inventors: Tobias Tynderfeldt, Solna (SE); Magnus Johansson, Gothenburg (SE); Jonas B. Karlsson, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

This patent is subject to a terminal disclaimer.

(21) Appl. No.: 16/012,482

(22) Filed: Jun. 19, 2018

(65) Prior Publication Data

US 2018/0302931 A1 Oct. 18, 2018

Related U.S. Application Data

(63) Continuation of application No. 13/873,600, filed on Apr. 30, 2013, now Pat. No. 10,015,822, which is a
(Continued)

(30) Foreign Application Priority Data

Oct. 31, 2007 (SE) .................................. 0702415-1

(51) Int. Cl.
*H04W 74/08* (2009.01)
*H04B 7/06* (2006.01)
*H04W 88/06* (2009.01)

(52) U.S. Cl.
CPC ...... *H04W 74/0833* (2013.01); *H04B 7/0617* (2013.01); *H04B 7/0689* (2013.01);
(Continued)

(58) Field of Classification Search
CPC . H04W 74/0833; H04W 88/06; H04W 74/08; H04B 7/0689; H04B 7/0697; H04B 7/0617

See application file for complete search history.

(56) References Cited

U.S. PATENT DOCUMENTS

| 7,408,907 B2 | 8/2008 | Diener et al. |
| 8,218,609 B2 | 7/2012 | Walton et al. |
| (Continued) | | |

FOREIGN PATENT DOCUMENTS

| CN | 1124076 A | 6/1996 |
| CN | 1234169 A | 11/1999 |
| (Continued) | | |

OTHER PUBLICATIONS

Bao, Lichun et al., "Receiver-Oriented Multiple Access in Ad Hoc Networks with Directional Antennas", Wireless Networks; The Journal of Mobile Communication, Computation and Information, vol. 11, No. 1-2, Jan. 2005, pp. 67-79.
(Continued)

*Primary Examiner* — Lakeram Jangbahadur
(74) *Attorney, Agent, or Firm* — Murphy, Bilak & Homiller, PLLC

(57) ABSTRACT

A method for use in a first node in a wireless access communication system (100). According to the method, the first node controls traffic to and from users, UEs, within a certain area in the system, a cell, and the first node is equipped with a plurality of transmit antennas. The first node can employ a variety of multi antenna transmit modes for downlink transmissions, i.e. transmissions to the UEs, and the first node can carry out a so called Random Access (RA) procedure with UEs which do not have a dedicated uplink resource, i.e. a resource to the eNodeB. According to the
(Continued)

method, one and the same downlink multi antenna transmit mode is used by the first node during the RA procedure.

18 Claims, 6 Drawing Sheets

Related U.S. Application Data continuation of application No. 12/738,639, filed as application No. PCT/SE2008/050026 on Jan. 10, 2008, now Pat. No. 8,457,647.

(52) U.S. Cl.
CPC .......... *H04B 7/0697* (2013.01); *H04W 74/08* (2013.01); *H04W 88/06* (2013.01)

(56) References Cited

U.S. PATENT DOCUMENTS

| | | | |
|---|---|---|---|
| 2004/0082356 A1* | 4/2004 | Walton | H04B 7/0669 455/522 |
| 2004/0136349 A1 | 7/2004 | Walton et al. | |
| 2004/0156328 A1 | 8/2004 | Walton et al. | |
| 2006/0276227 A1 | 12/2006 | Dravida et al. | |
| 2007/0253368 A1 | 11/2007 | Zhang et al. | |
| 2007/0263579 A1* | 11/2007 | Ozluturk | H04B 7/0413 370/338 |
| 2007/0293224 A1 | 12/2007 | Wang et al. | |
| 2008/0181177 A1 | 7/2008 | Flore et al. | |
| 2008/0188219 A1* | 8/2008 | Fischer | H04W 74/0866 455/434 |
| 2008/0273610 A1* | 11/2008 | Malladi | H04W 74/002 375/260 |
| 2008/0316913 A1 | 12/2008 | Kim et al. | |
| 2009/0312018 A1 | 12/2009 | Moulsley et al. | |
| 2010/0093386 A1* | 4/2010 | Damnjanovic | H04W 74/002 455/522 |
| 2010/0099366 A1 | 4/2010 | Sugar et al. | |
| 2010/0284477 A1 | 11/2010 | Kwon et al. | |

FOREIGN PATENT DOCUMENTS

| | | |
|---|---|---|
| CN | 1663213 A | 8/2005 |
| CN | 1717900 A | 1/2006 |
| CN | 1805326 A | 7/2006 |
| CN | 1906892 A | 1/2007 |
| CN | 101444137 A | 5/2009 |
| EP | 1615384 A1 | 1/2006 |
| EP | 1643661 A2 | 4/2006 |
| WO | 2008050996 A2 | 5/2008 |

OTHER PUBLICATIONS

Ghosh, A et al., "Random Access Design for UMTS Air-Interface Evolution.", Ghosh, A. et al. "Random Access Design for UMTS Air-Interface Evolution." IEEE 65th Vehicular Technology Conference, IEEE Conference Publications, Apr. 22-25, 2007, pp. 1041-1045, Dublin, Ireland., Apr. 22-25, 2007, pp. 1041-1045.

Thomas, George, "Random Access with Multi-Beam Antenna Arrays", IEEE 2002, 749-756.

Unknown, Author, "Diversity for Random Access", ETRI, 3GPPTSG RAN WGI #45, R1-061116, Shanghai, China, May 8-12, 2006, 1-6.

* cited by examiner

SELECTION OF TRANSMIT MODE DURING A RANDOM ACCESS PROCEDURE

TECHNICAL FIELD

The present invention discloses a method for use in a node in a wireless access communication system, in which system the first node serves to control traffic to and from users, UEs, within a cell in the system.

BACKGROUND

In wireless cellular systems such as, for example, the 3G Long Term Evolution ("3G LTE"), WiMAX and WCDMA systems, the nodes which control traffic to and from users in the cells of the systems, said nodes being referred to by various names in the various systems, for example "eNodeB" in LTE systems, can be equipped with multiple antennas for transmission and/or reception, and will thus be able to use various multi antenna transmission techniques. Examples of such techniques are transmit diversity, spatial multiplexing, and beam forming with dedicated reference signals. Such techniques may in fact become integral parts of the systems.

Accordingly, in the kind of systems mentioned above, there may be a variety of multi antenna transmission techniques or modes employed, which makes it important for all parties in a cell of the system to know which mode that is to be used in a certain situation or at a certain point in time. This is especially true for so called Random Access procedures, i.e. a procedure which is used by a user in a cell of the system when the user does not have a dedicated channel to the controlling node of the cell. A user may have a variety of devices by means of which he communicates with the system, examples of such devices being cellular telephones and portable computers. In the continued description, the generic term "user terminal" will also be employed.

Another factor which underlines the importance for the user terminals in a cell to know which multi antenna transmission mode that is to be used during, for example, the so called Random Access (RA) procedure, is the fact that many kinds of user terminals are equipped with multiple antennas, a trend which will probably increase in the future. If multiple antennas in the user terminal are to be used in the fashion demanded by the multi antenna transmission mode which is used by the eNodeB (or a corresponding node) in the cell, it is of course important for the user terminals to be aware of which mode it is that is in use at present, or that is to be used either in a certain situation.

SUMMARY

As has emerged from the description above, in wireless cellular systems which use multi antenna transmission modes, there is a need for a solution by means of which the users in a cell could know which of the multi antenna transmission modes that will be employed in the cell during RA procedures at any given point in time.

This need is addressed by the present invention in that it discloses a method for use in a first node in a wireless access communication system. In the system which the invention is applied, the first node controls traffic to and from users, UEs, within a certain area in the system, a cell, and according to the method of the invention, the first node is equipped with a plurality of transmit antennas and can employ multi antenna transmission modes for downlink transmissions, i.e. transmissions to the UEs.

In addition, the first node can carry out a so called Random Access (RA) procedure with UEs which do not have a dedicated uplink resource, i.e. a resource to the first node, and according to the invention, one and the same multi antenna transmission mode is used by the first node during the RA procedure.

Thus, since one and the same multi antenna transmission mode is used by the first node during the RA procedure, and this mode can be made known to the user terminals in the cell, user terminals attempting the RA procedure will be able to employ their antennas for reception in an optimal way.

The multi antenna transmission mode which according to the invention is used during the RA procedure can, in various embodiments of the invention, be determined in a number of ways:

The multi antenna transmission mode for RA can be used not only by the first node in question, but also by an additional such first node in the system. This could be the case, if, for example, the mode is set by the standard of the system, or by the operator of the particular system.

The multi antenna transmission mode which is to be used by the first node during the RA procedure can be changed by the first node, in which case the first node will signal the "new" mode to the UEs in the cell by signalling in a broadcast channel. In such a case, the first node gains at least "semi-independence" with respect to the choice of multi antenna transmission mode for RA, since the first node can change a mode which has been set in the way outlined in the previous bullet point.

The multi antenna transmission mode which is to be used by the first node during the RA procedure can be defined by the first node, and will then be signalled in a broadcast channel to the UEs in the cell. In this version of the embodiment, the first node thus gains more or less complete autonomy with regard to which multi antenna transmission mode that is to be used for the RA procedure.

As can be seen, the invention offers a great degree of flexibility regarding which multi antenna transmission mode that is used in a cell during RA procedures. This and other advantages of the present invention will become even more evident from the appended detailed description.

In addition to the inventive method, the invention also discloses a first node which functions according to the inventive method, as well as a corresponding user terminal.

BRIEF DESCRIPTION OF THE DRAWINGS

The invention will be described in more detail in the following, with reference to the appended drawings, in which.

DETAILED DESCRIPTION

Figure 1:
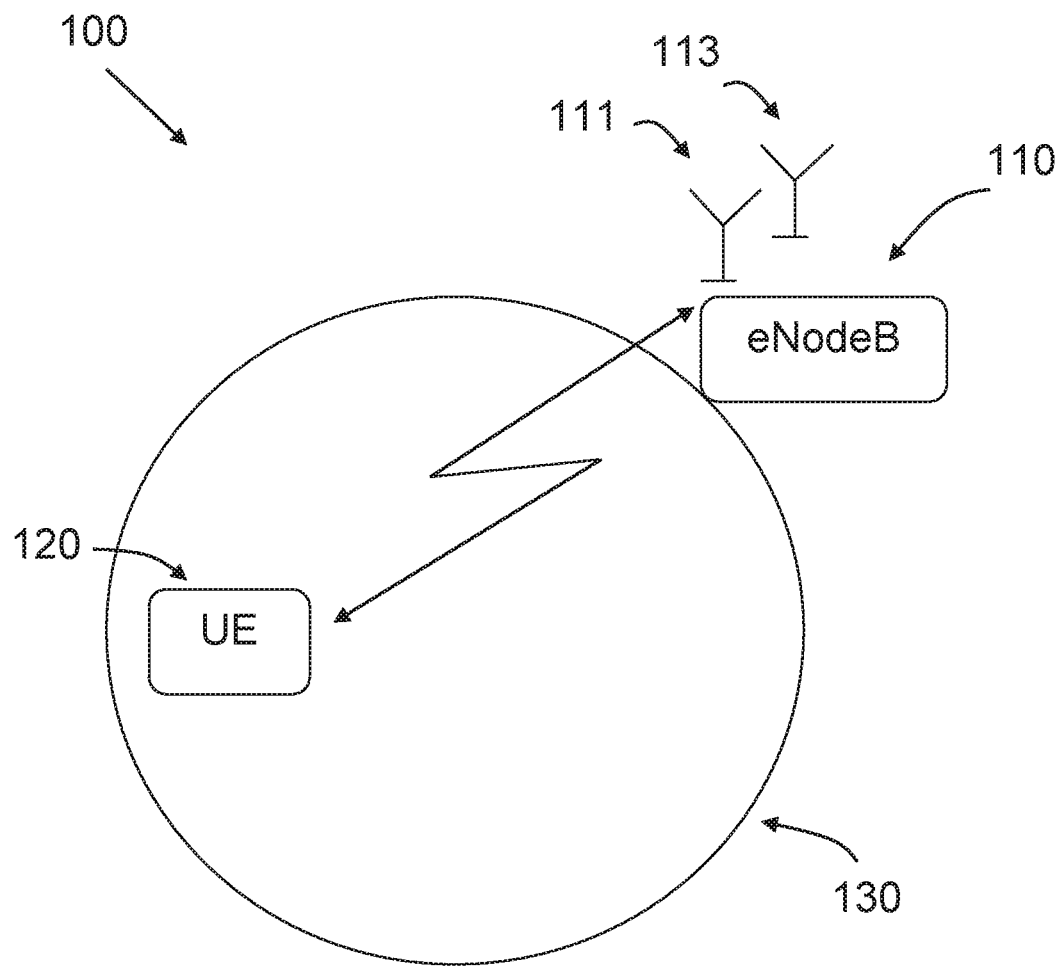
FIG. 1 shows a schematic view of a system in which the invention may be applied.

FIG. 1 shows an example of a wireless access communications system 100 in which the present invention may be applied. The invention will be described below and in the following as being an LTE system, so that the terminology and the components of the system 100 used in the descriptive example will be LTE terminology and components. However, it should be pointed out that the system can be applied in wide variety of systems, some of which will be enumerated in this description, so the use of an LTE system in the drawings and following description should be seen merely as an example intended to facilitate the reader's understanding of the invention.

Returning now to the system 100 shown in FIG. 1, the system 100 comprises a number of cells, one of which is shown in FIG. 1 as 130. In each cell of the system, there can be a number of users, one of which is shown in the cell 130 as 120. A user is often referred to with the generic term User Equipment, abbreviated as "UE", an abbreviation which will also be used in this text.

As is also shown in FIG. 1, in the system 100 in which the invention can be applied, there is also a first or controlling node 110 for each cell which, inter alia, serves to control traffic to and from the users in the cell. The exact role of this node varies between different systems, as well as its name, but in LTE systems the node is known as "eNodeB", while it in some other systems is known as NodeB or Radio Base Station. Some other names for such "first nodes" in other systems are Base Station (WiMAX systems), Access Point (WLAN systems), and BIS (Base Transceiver Station, GSM systems). As is shown in FIG. 1, the first node 110 is equipped with a plurality of antennas, two of which are shown as 111 and 113 in FIG. 1. Naturally, the exact number of antennas can be varied greatly within the scope of the present invention.

One application for the present invention is the so called Random Access Procedure, the "RA" procedure, a procedure which is performed for a UE which does not have a dedicated channel to the eNodeB, but wishes to establish such a connection. Thus, a basic description of a typical RA procedure will be given below, in order to enable the reader to appreciate some of the problems which may be overcome by the present invention. The RA procedure from the LTE system will be used to exemplify the RA principle.

Random Access

In LTE, as in any communication system, a UE may need to contact the network (which is done via the eNodeB) without having a dedicated resource in the uplink ("UL"), i.e. to the eNodeB. To handle such situations, a so called Random Access ("RA") Procedure is available, in which a UE that doesn't have a dedicated UL resource may initiate a procedure that will lead to the UE being allocated a dedicated UL resource.

The first message of the RA procedure is typically transmitted by the UE on a special resource reserved for random access, a so called random access channel, "RACH". This channel can, for instance, be limited in time and/or frequency, as is the case in LTE.

In LTE, the random access procedure can be used for a number of different reasons. Examples of such reasons are:
Initial access, for UEs in the LTE_IDLE or LTE_DETACHED states,
Incoming handover,
Resynchronization of the UE's UL,
Scheduling request, used by a UE which is not allocated any other resource for contacting the eNodeB.

Figure 2:
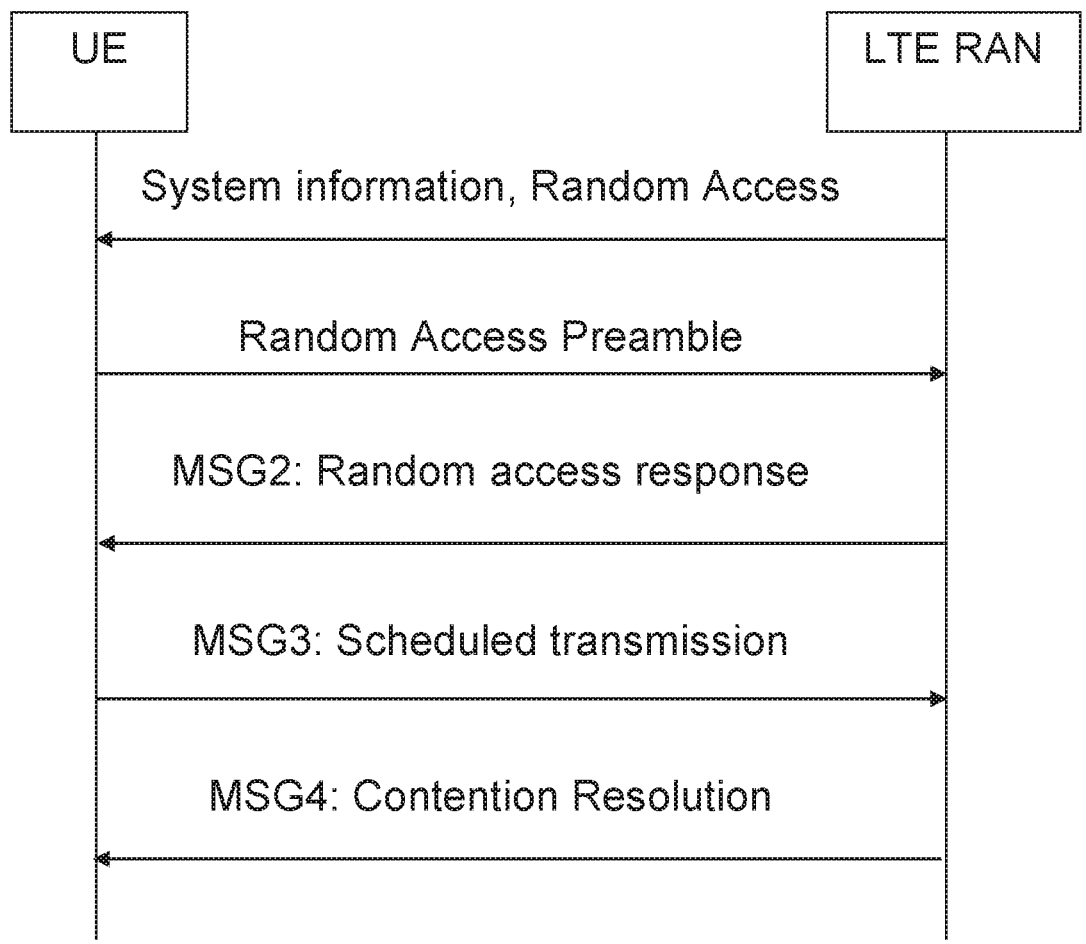
FIG. 2 shows signalling for the contention-based random access procedure in LTE.

The contention-based random access procedure which is used in LTE is illustrated in FIG. 2. A UE starts the random access procedure by randomly selecting one of a number of so called preambles which are available for contention-based random access. The UE then transmits the selected random access preamble on the physical random access channel (PRACH) to the eNodeB in the RAN, the Radio Access Network.

The RAN acknowledges preambles it detects by transmitting a random access response, shown as MSG2 in FIG. 2, including an initial grant to be used on the uplink shared channel, as well as an identifier, such as, for example, a temporary C-RNTI, Cell RNTI, Radio Network Temporary Identifier, and a time alignment, TA, update. When receiving the response from the eNodeB the UE uses the grant to transmit a message (MSG3 in FIG. 2) which in part is used to trigger the establishment of radio resource control and in part to uniquely identify the UE on the common channels of the cell. The RA procedure ends with the RAN solving any preamble contention that may have occurred (MSG4 in FIG. 2), in the case that multiple UEs transmitted the same preamble at the same time.

The random access response message (MSG2) is a scheduled message transmitted on the downlink shared channel that can contain responses to multiple random access preambles detected on the same PRACH, i.e. it cannot always be adapted to the radio channel towards a single UE.

In the LTE systems, an additional random access procedure has been defined, a so called contention-free, or non-contention based, random access. According to this procedure, a UE is allowed to use a dedicated random access preamble for its initial transmission on the PRACH. Since this message is only allowed to be used for that specific UE, it is possible for the eNodeB to identify the UE already upon reception of the random access preamble. This procedure can be used when an eNodeB knows that a UE will perform a random access. This is the case for:
Incoming handover,
Network triggered re-synchronization of the UL (when the eNodeB needs to transmit something to a UE whose UL is out-of-sync).

Figure 3:
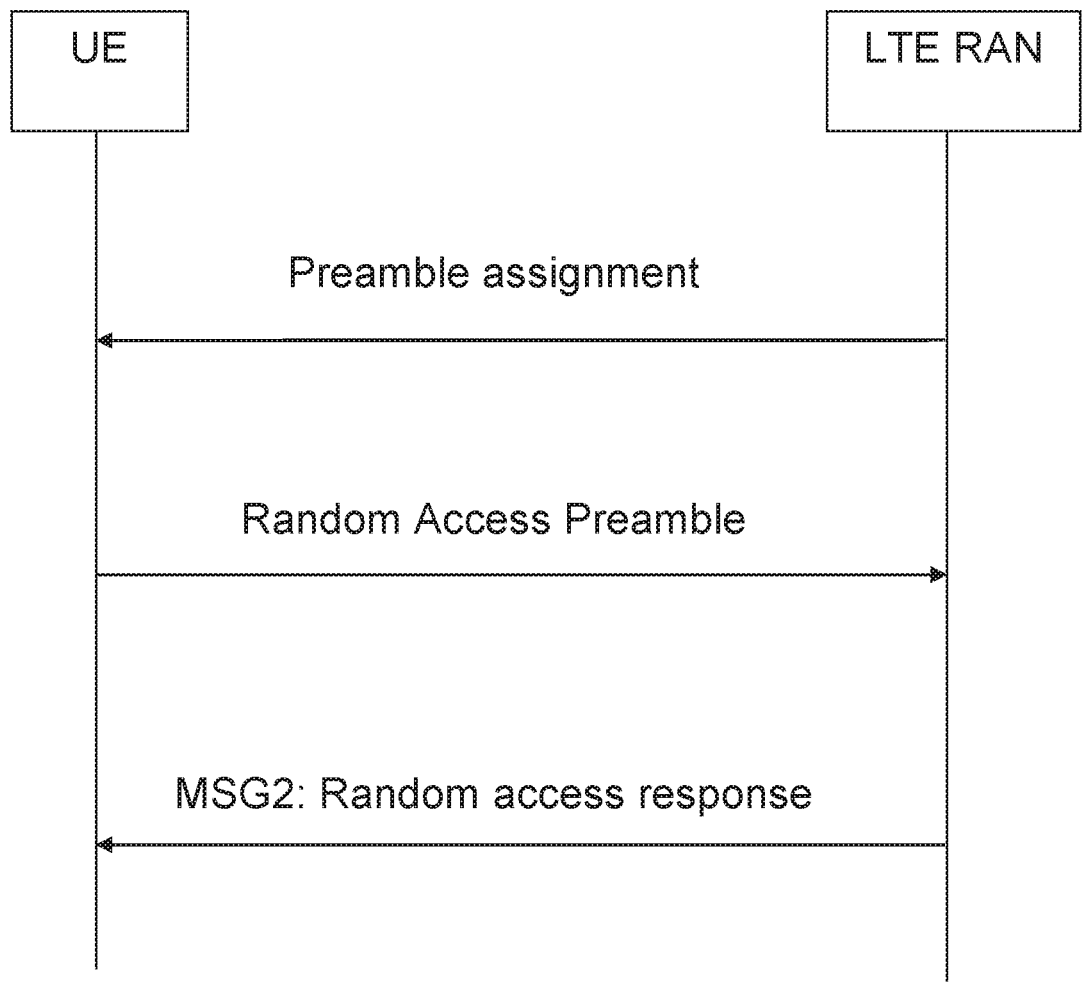
FIG. 3 shows signalling for the contention-free random access procedure in LTE.

The dedicated preambles for use in this procedure are distributed by the eNodeB in preparation for such procedures, which is shown in FIG. 3, in which the contention-free random access procedure is illustrated. The procedure consists of two messages: The dedicated random access preamble transmitted in UL on the PRACH, and the random access response message (MSG2) transmitted in DL on the scheduled downlink shared channel, DL-SCH.

Problems with Existing Random Access Solutions

As explained previously, the present invention is intended for systems in which the eNodeB can use its plurality of antennas in order to use a number of different multi antenna transmission modes. The multi antenna transmission mode in such a system is usually selected by the eNodeB based on parameters such as, for example, the radio channel characteristics, which requires information about how a particular radio channel is "perceived" by the UE, i.e. the channel/reception quality at the UE, information which is not always available to the eNodeB.

In particular, for the case of initial access, when the UE contacts the eNodeB for the first time, knowledge about the UE's perception of a radio channel is not available at the eNodeB, and it is therefore not possible to select the appropriate multi antenna transmission mode based on that parameter. Furthermore, during the contention-based random access procedure, the eNodeB is not aware of which UE that a certain random access preamble belongs to, or why the UE initiated a random access preamble. The eNodeB can therefore not determine which multi antenna transmission mode to use.

Thus, summing up the description of the Random Access Procedure and the problems associated with it, it can be seen that there is a need for a solution by means of which the problem of different multi antenna transmission modes during the RA procedure can be resolved.

The present invention addresses this need by disclosing a method for use in a wireless access communication system such as the LTE system. As is usually the case in such systems, there is a first node, in LTE systems the eNodeB, which controls traffic to and from users, UEs, within a cell in the system. According to the method of the invention, the first node is equipped with a plurality of antennas, which it can use to employ multi antenna transmission modes for downlink transmissions, i.e. transmissions to the UEs.

The first node can carry out a so called Random Access (RA) procedure with UEs which do not have a dedicated uplink resource, i.e. a resource to the eNodeB, and according to the method of the invention, one and the same downlink multi antenna transmission mode is used by the first node during the RA procedure.

Since one and the same DL multi antenna transmission mode is used by the first node during the RA procedure, all of the UEs in a cell will know which mode they should expect during RA, which will greatly simplify the situation.

The manner in which the multi antenna transmission mode for the RA procedure is chosen can be varied according to the invention, as will be exemplified below:

In one embodiment of the invention, the DL multi antenna transmission mode which is to be used by the first node during the RA procedure is used by at least one additional such first node in the system. This may be the case if, for example, the DL multi antenna transmission mode for RA is set by the standard of the system, or if the operator of the system for some other reason decides to use a certain DL multi antenna transmission mode during RA in all or parts of his system.

In another embodiment of the invention, which can be said to be a version of the embodiment described immediately above, the multi antenna transmission mode which is to be used by the first node during the RA procedure can be changed by the first node, i.e. the first node of a cell has the possibility of overriding a "central" decision regarding DL multi antenna transmission mode during RA. In such a case, the UEs in the cell need to be made aware of which mode that is to be used in the DL during RA, which is suitably signalled by the first node to the UEs in the cell by signalling in a so called broadcast channel.

In a further embodiment of the invention, the DL multi antenna transmission mode which is to be used by the first node during the RA procedure is defined by the first node, i.e. the first node is more or less autonomous regarding the choice of DL multi antenna transmission mode. In this case as well, the mode needs to be signalled to the UEs in the cell of the first node, which in this embodiment of the invention is signalled to the UEs in the cell by the first node in a broadcast channel.

Before more aspects of the present invention are explained, a brief introduction to some possible multi antenna transmission modes which can be used in the DL during RA procedure will be given. As will be realized, the invention can be applied to a system which employs more or less any kind of DL multi antenna transmission mode during the RA procedure. However, some examples of common multi antenna transmission modes are:

Transmit diversity,
Spatial Multiplexing,
Beam forming with dedicated reference signals.

A more in-depth description of these multi antenna transmission modes will be given last in this description.

Apart from letting the UEs in a cell know which DL multi antenna transmission mode that is to be used during the RA procedure, it could also be an advantage if the UEs in a cell could know in advance which DL multi antenna transmission mode that would be employed by the first node in the cell after completion of the RA procedure.

This advantage is provided by one aspect of the present invention, which discloses how the DL multi antenna transmission mode to be used in a cell at the completion of the RA procedure can be selected and determined.

Since the DL multi antenna transmission mode to be used after completion of the RA procedure may be made dependent on the UE's reason for initiating, those reasons will first be repeated below, as follows:

Initial access, e.g. for UEs in the LTE_IDLE or LTE_DETACHED states,
Incoming handovers,
Resynchronization of a UE's UL,
Scheduling request, used by a UE which is not allocated any other resource for contacting the eNodeB.

In a first embodiment of this version of the present invention, the DL multi antenna transmission mode to be used by the first node after completed RA procedures is simply standardized to be the same mode which is used during the RA procedure. This embodiment may suitably be applied to a UE which initiates the RA procedure as part of a so called initial access procedure, or to a UE which is being handed over to cell of the first node but which has not received any information on the RA multi antenna transmission mode during the handover procedure.

In a second embodiment of this version ("DL multi antenna transmission mode after RA procedure") of the present invention, the first node determines which DL multi antenna transmission mode it intends to use after completed RA procedures, and signals this to the UEs in the cell in a broadcast channel. The first node can choose the mode based on a number of factors, such as, for example, the physical antenna configuration or the cell size.

This second embodiment may also suitably be applied to a UE which initiates the RA procedure as part of a so called initial access procedure, or for a UE which is being handed over to cell of the first node but which has not received any information on the RA diversity mode during the handover procedure.

In a third embodiment of this version of the present invention, the UE reverts to a previous or to an initial DL multi antenna transmission mode after completing the RA procedure. This third embodiment may suitably be applied to UEs which have initiated the RA procedure because they need to resynchronize their UL connection, or because they carry out a scheduling request, which is the case for UEs which are not allocated any other resources for contacting the eNodeB.

The terms previous and initial are here used in the following sense: The initial mode is the "common" mode to be used after initial access according to the second embodiment as described above, while the previous mode is the "dedicated" mode used by a specific UE before it lost uplink synchronization. In an alternative of this embodiment, a time limit can be introduced, and used in the following fashion: the "previous" multi-antenna transmission mode is used if the time which has elapsed since the latest transmission from/to the UE is below the time limit, and conversely, if the time limit has been exceeded, the "initial" mode is used.

Above, advantageous combinations of DL multi antenna transmission mode to be used after completion of the RA procedure and a UE's reason for initiating the RA procedure have been enumerated. However, it should be emphasized that although the combinations given above are advantageous, all combinations could be possible, i.e. all combinations of reasons for initiating the RA procedure and the DL multi antenna transmission mode after completion of the RA procedure.

Figure 4:
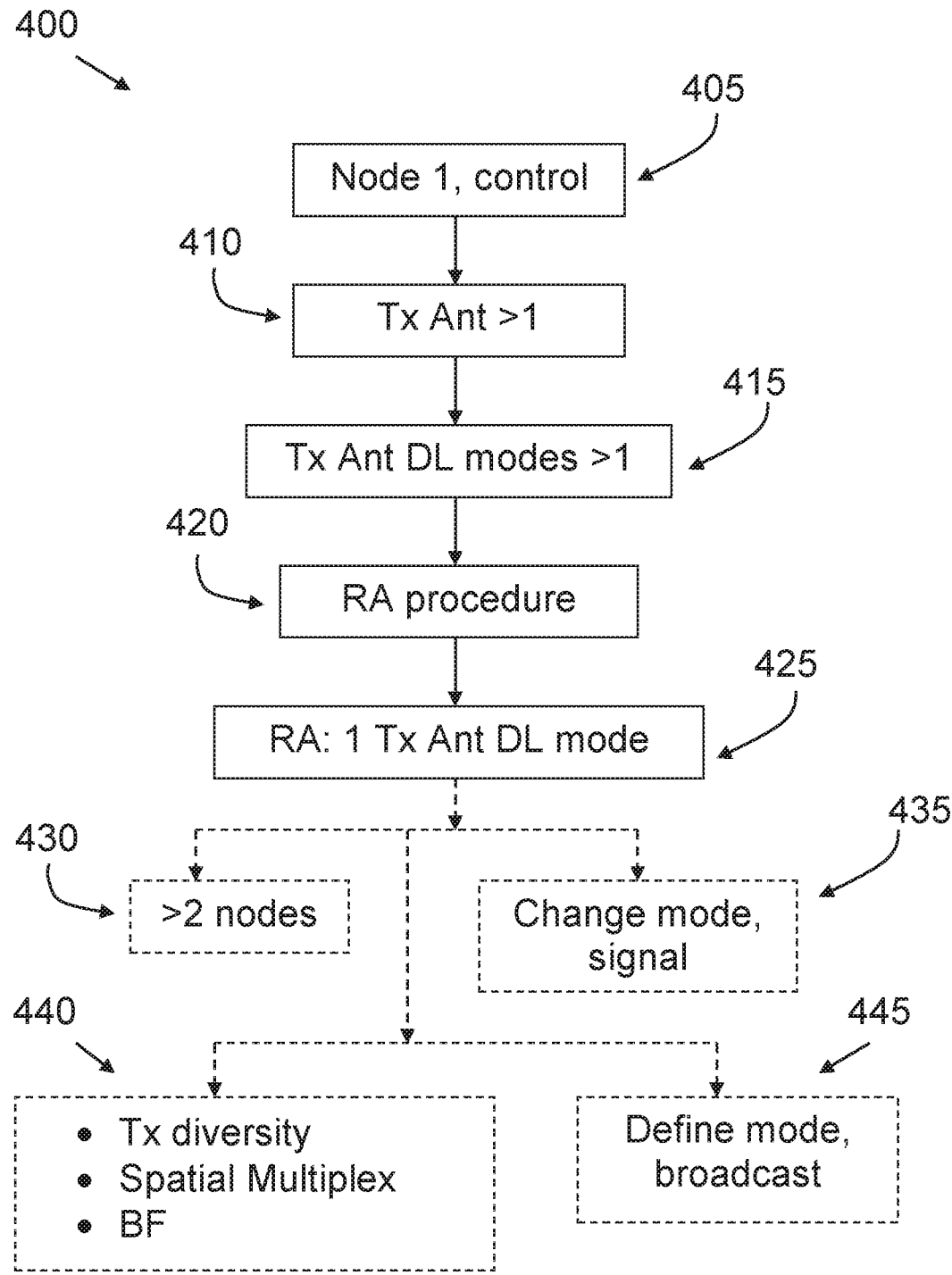
FIG. 4 shows a flow chart of a method of the invention.

FIG. 4 shows a rough flow chart of a method 400 of the invention. Steps which are options or alternatives are indicated with dashed lines. As has emerged from the description, the method 400 is intended for use in a first node such as the one 110 in FIG. 1, in a wireless access communication system such as the system 100 in FIG. 1. According to the inventive method, as shown in step 405, the first node serves to control traffic to and from users, UEs, such as the UE 120 of FIG. 1, within a certain area in the system, a cell, such as the one 130 of FIG. 1. As shown in step 410, the first node is equipped with a plurality of transmit antennas, shown as 111 and 113 in FIG. 1.

Step 415 shows that the first node can employ a variety of multi antenna transmit modes for downlink transmissions, i.e. transmissions to the UEs, and step 420 shows that the first node can carry out a so called Random Access, RA, procedure with UEs which do not have a dedicated uplink resource, i.e. a resource to the eNodeB. According to the inventive method, as shown in step 425, one and the same downlink multi antenna transmit mode is used by the first node during the RA procedure.

Step 430 shows that the multi antenna transmit mode which is to be used by the first node during the RA procedure may be used by at least one additional such first node in the system.

As shown in step 435, the multi antenna transmit mode which is to be used by the first node during the RA procedure can in one embodiment of the invention be changed by the first node, in which case the first node signals the mode to the UEs in the cell by signalling in a broadcast channel.

In an alternative embodiment, as shown in step 445, the multi antenna transmit mode which is to be used by the first node during the RA procedure is defined 445 by the first node and signalled in a broadcast channel to the UEs in the cell.

As shown in step 440, at least the following multi antenna transmit modes are possible for use by the first node:
Transmit diversity,
Spatial Multiplexing,
BF, Beam Forming with dedicated reference signals.

Although not explicitly shown in FIG. 4, the following are some other possible embodiments of the inventive method:

The multi antenna transmit mode which is used by the first node after the RA procedure may be the same as the one used during the RA procedure. This embodiment may in particular be used by the first node for a UE which performs the RA procedure as part of a so called initial access procedure, or for a UE which is being handed over to cell of the first node and which has not received any information on the RA multi antenna transmit mode during the handover procedure.

The multi antenna transmit mode which is used by the first node after the RA procedure may be chosen by the first node and will then be signalled by the first node to the UEs in the cell in a broadcast channel. This embodiment may in particular be used by the first node for a UE which performs the RA procedure as part of a so called initial access procedure, or for a UE which is being handed over to cell of the first node and which has not received any information on the RA multi antenna transmit mode during the handover procedure.

The first node may, after a UE has carried out a resynchronization procedure or signalled a scheduling request, use the same multi antenna transmit mode as was used before said resynchronization procedure or scheduling request.

One of the multi antenna transmission modes of the invention may be used by the first node after a UE has carried out a resynchronization procedure or signalled a scheduling request, uses an initial multi antenna transmit mode.

For UEs which are to be handed over to the first node from other such first nodes, the first node signals the multi antenna transmit mode that it uses to the UEs which are to be handed over to it, with the signalling being carried out during the preparations for said handover.

Figure 5:
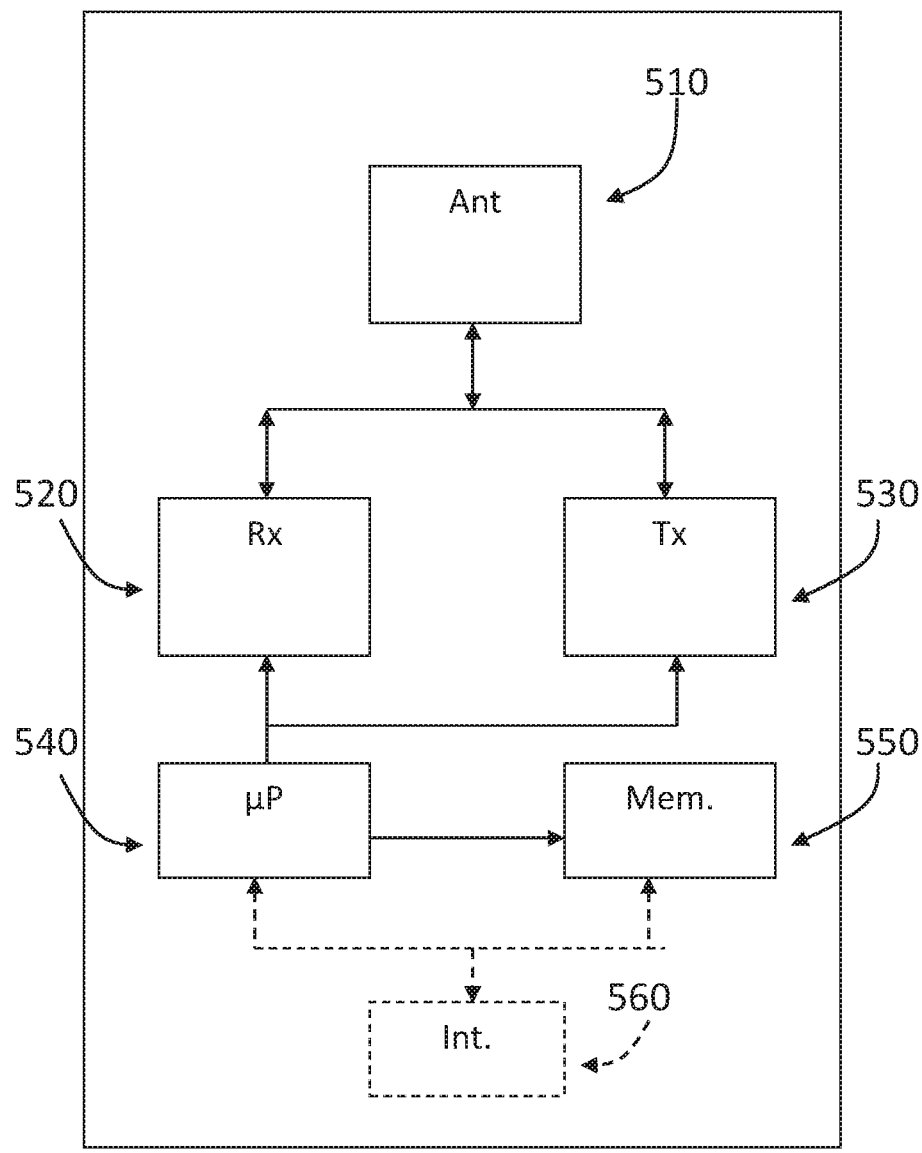
FIG. 5 shows a block diagram of a first node of the invention.

FIG. 5 shows a schematic block diagram of a transceiver 500 for use as a first node in a system in which the invention is applied. As indicated in FIG. 5, the first node 500 will comprise a number of antennas, shown as one block 510, and will also comprise a receive part 520 and a transmit part 530. In addition, the first node 500 also comprises a control means 540 such as a micro processor, as well as a memory 550. Furthermore, the first node 500 also comprises an interface 560 towards other components in the system apart from the UEs.

The first node 500 of the invention will use the control means 540 for controlling traffic to and from users, UEs, within a certain area in the system, a cell, and will have a plurality of transmit antennas, shown in FIG. 5 as one block 510.

The control means 540 together with the memory means 550 will be used by the first node 500 of the invention for choosing among, and using, a variety of multi antenna transmit modes for downlink transmissions, i.e. transmissions to the UEs. In addition, the first node 500 will use the antennas 510, the receive part 520, the transmit part 530 and the control means 540 together with the memory 550 for carrying out a so called Random Access (RA) procedure with UEs which do not have a dedicated uplink resource, i.e. a resource to the first node. The first node 500 of the invention will use one and the same downlink multi antenna transmit mode during the RA procedure.

In one embodiment, the control means 540 and the memory 550 will be used by the first node 500 for changing the multi antenna transmit mode which is to be used by the first node during the RA procedure. These means, together with the antennas 510 and the transmitter 530 are used by the first node 500 for signalling the mode to the UEs in the cell in a broadcast channel.

In another embodiment, the first node 500 uses control means 540 together with the memory means 550 for defining which multi antenna transmit mode that is to be used by the first node during the RA procedure, and uses the transmitter 530 and the antennas 510 for signalling this in a broadcast channel to the UEs in the cell.

The first node 500 of the invention can use at least the following multi antenna transmit modes:
Transmit diversity,
Spatial Multiplexing,
Beam forming with dedicated reference signals.

In one particular embodiment, the first node 500 uses the same multi antenna transmit mode after the RA procedure as during the RA procedure.

In another particular embodiment, the first node 500 uses the memory 550 and the control means 540 for choosing the multi antenna transmit mode which is to be used after the RA procedure, and uses the transmitter 530 together with the antennas 510 for signalling this mode to the UEs in the cell in a broadcast channel.

In a further embodiment, the first node 500, after a UE has carried out a resynchronization procedure or signalled a scheduling request, uses the same multi antenna transmit mode as was used before said resynchronization procedure or scheduling request.

In another further embodiment, the first node 500 uses an initial multi antenna transmit mode after a UE has carried out a resynchronization procedure or signalled a scheduling request.

In yet a further embodiment, which is mainly intended for use in connection with so called hand over, the first node 500 signals the multi antenna transmit mode that is to be used to UEs which are to be handed over to the first node, said signalling being carried out during the preparations for said handover.

Figure 6:
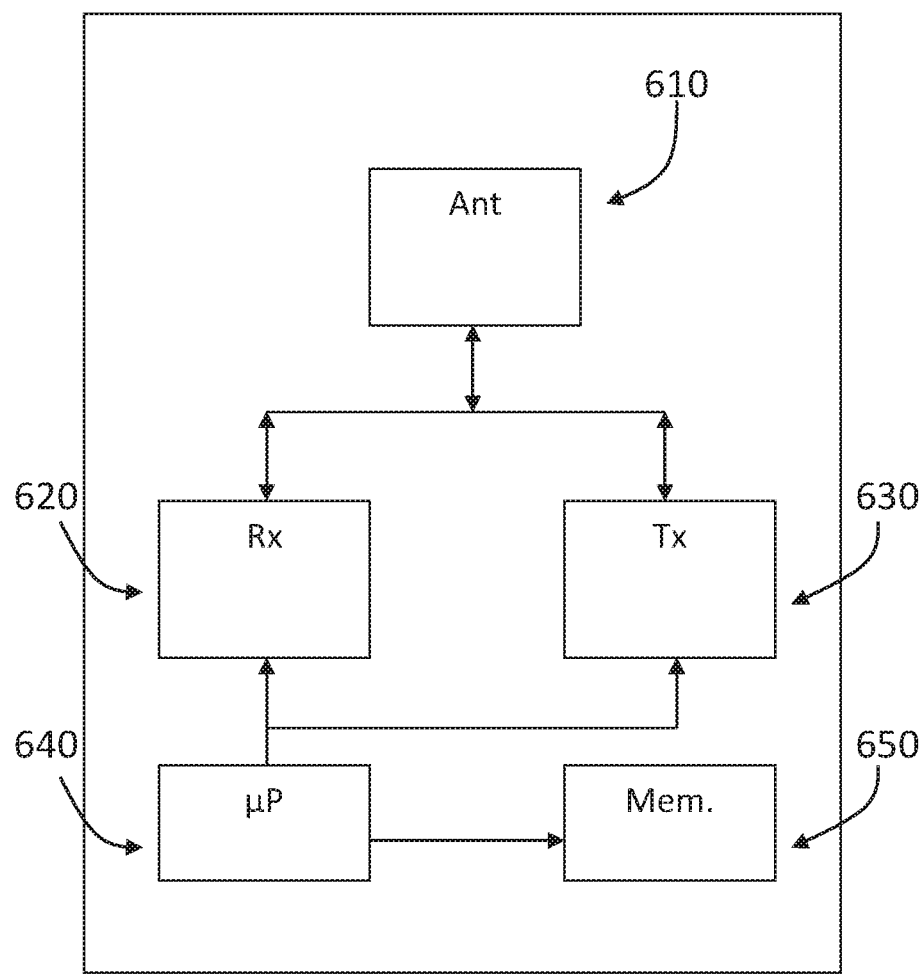
FIG. 6 shows a block diagram of a user terminal of the invention.

FIG. 6 shows a schematic block diagram of an inventive transceiver 600 for use as a user equipment, a UE, in a system in which the invention is applied. As indicated in FIG. 6, the UE 600 will comprise at least one antenna, shown as block 610, and will also comprise a receive part 620 and a transmit part 630. In addition, the UE 600 also comprises a control means 640 such as a micro processor, as well as a memory 650.

The UE 600 of the invention will use the antenna 610, the receiver 620, the transmitter 630, and the control means 640) for communication with a first node of the system, such as an eNodeB. The control means 640 and the memory 650 will be used for adapting to a variety of multi antenna transmit modes in transmissions from said first node.

The UE of the invention can carry out so called so called Random Access (RA) in cases when the UE does not have a dedicated uplink resource, i.e. a resource to the first node, which will be done by means of the antenna 610, the receiver 620, the transmitter 630, the control means 640 and the memory 650. The UE 600 of the invention comprises means such as the antenna 610 and the receiver 620 for receiving information about the multi antenna transmit mode of the first node and means such as the controller 640 and the memory 650 for adapting to said mode.

In one embodiment, the UE 600 of the invention can receive said information on a broadcast channel in the system.

The adaption by the UE 600 to different multi antenna transmit modes includes the UE adjusting its receiver according to the mode. In addition, the feedback reporting, i.e. channel quality, rank, pre-coding weights (sometimes referred to as "phase") will vary depending on the multi antenna transmit mode The invention is not limited to the examples of embodiments described above and shown in the drawings, but may be freely varied within the scope of the appended claims.

In addition, since much of the present invention deals with multi antenna transmission techniques to be used in DL during the RA procedure, examples of some such multi antenna transmission techniques will now be described in more detail than previously.

Transmit Diversity

The aim of transmit diversity is to utilize multiple transmit antennas to reduce variations in a fading radio channel. Transmit diversity does not require detailed knowledge about the radio channel between the transmitter and receiver, and is therefore beneficial to use in cases when the eNodeB does not have good channel knowledge about a certain UE. This could for instance be due to the fact that the UE is moving rapidly, and for that reason has a radio channel with rapidly varying fading. Another case when the eNodeB does not have good channel knowledge is when the eNodeB only receives infrequent feedback about the radio channel quality from the UE. Transmit diversity may also be desirable to use for UEs with low data rate transmissions, or for UEs with poor channel quality, said quality for example typically being measured as the SINR, Signal to Interference plus Noise Ratio, as well as.

Spatial Multiplexing

A second multi antenna transmit mode is the spatial multiplexing mode. In spatial multiplexing transmission, independent streams of data are transmitted from the transmitter (e.g. the eNodeB), and relies on advanced multi-antenna receiver algorithms in the receiver (e.g. the UE) to separate the data streams that have been mixed during the transmission over the radio channel. Depending on the quality of the radio channel, varying number of data streams can be resolved by the receiver. Since the number of streams that can be supported varies with the radio channel, this needs to be fed back from the receiver to the transmitter. This adaptation of the number of streams is also called "rank adaptation", and needs to be carried out on a short time scale, e.g. in the order of a few milliseconds. The UE proposes a rank, and reports the channel quality to the first node for each stream.

When the rank is equal to 1, this means that only one data stream is transmitted. This corresponds to either transmission from a single antenna or more traditional beam forming from multiple antennas. For beam forming, the phase of the signals transmitted from the transmit antennas are adapted so that they add up coherently at the receiver. This phase adaptation typically also requires feedback from the receiver, and requires updates on the same short time scale as the rank adaptation.

LTE is a packet switched cellular system and the scheduling of users is done per subframe (of length 1 ms), i.e. different users can be scheduled from one subframe to the next. The rank and phase adaptation is signaled as part of the scheduling assignment message from the eNodeB to the UE.

Beam Forming with Dedicated Reference Signals.

A third multi antenna transmit mode is so called beam forming with dedicated reference signals. One and the same data stream is transmitted from all of the antennas involved, but the phase is adjusted for each antenna in order to achieve directivity, i.e. so that the beam points towards the UE in question. In this case, dedicated reference signals can be used in order to simplify demodulation in the UE. The dedicated reference signals are phase adjusted in the same way as the data, which means that the demodulation in the UE can be performed as for a single antenna transmission.

Dedicated reference signals do not need feedback from the UE since the eNodeB can estimate the direction of the UE based on received uplink signals. Therefore this mode is preferable when feedback for some reason cannot be used, or when the physical antenna configuration is suitable, such as when, for example, 8 correlated antennas are used in eNodeB.

What is claimed is:

1. A user equipment (UE) for a wireless access communication system, the UE comprising:
   a transmitter;
   a receiver;
   at least one receive antenna; and a processing circuit comprising a processor with memory, wherein the processing circuit is connected to the transmitter and receiver and is configured to control communication by the UE with a first node of the system via the transmitter and receiver, to carry out a Random Access (RA) procedure with the first node, the RA procedure including at least one transmission by the first node on a shared channel that supports transmission of messages using each of a plurality of multi-antenna transmission modes, and to adapt the UE to receive at least a random access response from the first node during the RA procedure according to one of the plurality of multi-antenna transmission modes;

wherein the processing circuit is configured to adapt the receiver to receive the at least one transmission according to the one of the plurality of multi-antenna transmit modes, based on information possessed by the UE;

wherein the at least one transmission by the first node on the shared channel comprises a scheduled random access response message, and wherein the receiver is adapted to receive the scheduled random access response message according to the one of the plurality of multi-antenna transmit modes.

2. The UE of claim 1, wherein the processing circuit is configured to receive information about the multi-antenna transmit mode used by the first node for the scheduled random access response.

3. The UE of claim 2, wherein the processing circuit is configured to receive the information on a broadcast channel in the system.

4. The UE of claim 1, wherein the first node is a radio base station.

5. A user equipment (UE) for a wireless access communication system, the UE comprising:
a transmitter;
a receiver;
at least one receive antenna; and
a processing circuit comprising a processor with memory, wherein the processing circuit is connected to the transmitter and receiver and is configured to control communication by the UE with a first node of the system via the transmitter and receiver, to carry out a Random Access (RA) procedure with the first node, the RA procedure including at least one transmission by the first node on a shared channel that supports transmission of messages using each of a plurality of multi-antenna transmission modes, and to adapt the UE to receive at least a random access response from the first node during the RA procedure according to one of the plurality of multi-antenna transmission modes;

wherein the processing circuit is configured to adapt the receiver to receive the at least one transmission according to the one of the plurality of multi-antenna transmit modes, based on information possessed by the UE;

wherein the at least one transmission by the first node on the shared channel comprises a random access response message transmitted by the first node, the random access response message comprising an initial grant of resource to be used by the UE on an uplink shared channel and a time alignment update.

6. The UE of claim 5, wherein the processing circuit is configured to receive information about the multi-antenna transmit mode used by the first node for the random access response transmitted by the first node.

7. The UE of claim 6, wherein the processing circuit is configured to receive the information on a broadcast channel in the system.

8. A user equipment (UE) for a wireless access communication system, the UE comprising:
a transmitter;
a receiver;
at least one receive antenna; and
a processing circuit comprising a processor with memory, wherein the processing circuit is connected to the transmitter and receiver and is configured to control communication by the UE with a first node of the system via the transmitter and receiver, to carry out a Random Access (RA) procedure with the first node, the RA procedure including at least one transmission by the first node on a shared channel that supports transmission of messages using each of a plurality of multi-antenna transmission modes, and to adapt the UE to receive at least a random access response from the first node during the RA procedure according to one of the plurality of multi-antenna transmission modes;

wherein the processing circuit is configured to adapt the receiver to receive the at least one transmission according to the one of the plurality of multi-antenna transmit modes, based on information possessed by the UE;

wherein the at least one transmission by the first node on the shared channel comprises two messages transmitted by the first node on the shared channel during the RA procedure.

9. The UE of claim 8, wherein the two messages transmitted by the first node on the shared channel during the RA procedure comprise a random access response message and a contention resolution message.

10. The UE of claim 8, wherein the processing circuit is configured to receive information about the multi-antenna transmit mode used by the first node for the two messages transmitted by the first node.

11. The UE of claim 10, wherein the processing circuit is configured to receive the information on a broadcast channel in the system.

12. A method, performed by a user equipment (UE) in a wireless communication system, the method comprising:
carrying out a random access (RA) procedure with a first node of the wireless communication system, wherein said carrying out the RA procedure comprises receiving at least a random access response message transmitted by the first node on a shared channel that supports transmission of messages using each of the plurality of multi-antenna transmit modes, according to one of the plurality of multi-antenna transmit nodes, wherein the method further comprises determining the multi-antenna transmit mode used by the first node during the RA procedure based on information possessed by the UE;
wherein the random access response message is a scheduled message transmitted on the shared channel.

13. The method of claim 12, further comprising receiving information about the multi-antenna transmit mode used by the first node during the RA procedure, prior to carrying out the random access procedure.

14. The method of claim 13, wherein the information is received on a broadcast channel in the system.

15. The method of claim 12, wherein the first node is a radio base station.

16. The method of claim 12, wherein the random access response message comprises an initial grant of resource to be used by the UE on an uplink shared channel and a time alignment update.

17. The method of claim 12, wherein said receiving comprises receiving two messages transmitted by the first node on the shared channel during the RA procedure.

18. The method of claim 17, wherein the two messages received from the first node on the shared channel during the RA procedure comprise the random access response message and a contention resolution message.

* * * * *

UNITED STATES PATENT AND TRADEMARK OFFICE
CERTIFICATE OF CORRECTION

| | |
|---|---|
| PATENT NO. | : 11,044,755 B2 |
| APPLICATION NO. | : 16/012482 |
| DATED | : June 22, 2021 |
| INVENTOR(S) | : Tynderfeldt et al. |

It is certified that error appears in the above-identified patent and that said Letters Patent is hereby corrected as shown below:

On the Title Page

In Item (57), under "ABSTRACT", in Column 2, Line 3, delete "users, UEs," and insert -- user equipments, UEs, --, therefor.

In the Drawings

In Fig. 1, Sheet 1 of 6, delete "Fig" and insert -- Fig. --, therefor at each occurrence throughout the figures (Figs. 1-6).

In the Specification

In Column 1, Line 8, delete "users, UEs," and insert -- user equipments, UEs, --, therefor.

In Column 1, Line 61, delete "system" and insert -- system in --, therefor.

In Column 1, Line 62, delete "users, UEs," and insert -- user equipments, UEs, --, therefor.

In Column 3, Line 27, delete "BIS" and insert -- BTS --, therefor.

In Column 5, Line 10, delete "users, UEs," and insert -- user equipments, UEs, --, therefor.

In Column 7, Line 17, delete "users, UEs," and insert -- user equipments, UEs, --, therefor.

In Column 8, Line 26, delete "micro processor," and insert -- microprocessor, --, therefor.

In Column 8, Line 31, delete "users, UEs," and insert -- user equipments, UEs, --, therefor.

In Column 8, Line 54, delete "control" and insert -- the control --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,044,755 B2

In Column 9, Line 28, delete "micro processor," and insert -- microprocessor, --, therefor.

In Column 9, Line 31, delete "640)" and insert -- 640 --, therefor.

In Column 9, Line 36, delete "so called so called" and insert -- so called --, therefor.

In Column 9, Line 54, delete "mode" and insert -- mode. --, therefor.